(12) United States Patent
Lehn et al.

(10) Patent No.: US 11,398,157 B2
(45) Date of Patent: Jul. 26, 2022

(54) METHOD FOR PREPARING AN EMPTY SECTION OF A PARKING FACILITY FOR AN OPERATION OF THE PARKING FACILITY AND METHOD FOR OPERATING THE PARKING FACILITY

(71) Applicant: Robert Bosch GmbH, Stuttgart (DE)

(72) Inventors: Andreas Lehn, Ludwigsburg (DE); Stefan Nordbruch, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 76 days.

(21) Appl. No.: 16/631,220

(22) PCT Filed: Jun. 6, 2018

(86) PCT No.: PCT/EP2018/064885
§ 371 (c)(1),
(2) Date: Jan. 15, 2020

(87) PCT Pub. No.: WO2019/015848
PCT Pub. Date: Jan. 24, 2019

(65) Prior Publication Data
US 2020/0143685 A1 May 7, 2020

(30) Foreign Application Priority Data
Jul. 19, 2017 (DE) .......................... 102017212375.3

(51) Int. Cl.
*G08G 1/16* (2006.01)
*G05D 1/02* (2020.01)
(Continued)

(52) U.S. Cl.
CPC ............. *G08G 1/168* (2013.01); *G01S 13/89* (2013.01); *G01S 15/89* (2013.01); *G01S 17/89* (2013.01);
(Continued)

(58) Field of Classification Search
CPC .......... G08G 1/168; G08G 1/146; G08G 1/16; G08G 1/14; G05D 1/02; G05D 1/0223;
(Continued)

(56) References Cited

U.S. PATENT DOCUMENTS 10,008,116 B1 * 6/2018 Sandbrook ............. G08G 1/143
10,311,731 B1 * 6/2019 Li ........................... G08G 1/146
(Continued)

FOREIGN PATENT DOCUMENTS

AT 508344 A1 12/2010
CN 104136935 A 11/2014
(Continued)

OTHER PUBLICATIONS

International Search Report for PCT/EP2018/064885, dated Sep. 21, 2018.

*Primary Examiner* — Tan Q Nguyen
(74) *Attorney, Agent, or Firm* — Norton Rose Fulbright US LLP; Gerard Messina

(57) ABSTRACT

A method for preparing an empty section of a parking-facility for operation of the parking-facility, including: measuring the empty section of the parking-facility, using a time-of-flight measuring-sensor situated in a stationary manner within the parking-facility, by emitting a time-of-flight measuring-signal with the time-of-flight measuring-sensor in the direction of the section and checking whether a reflection signal associated with the emitted time-of-flight measuring-signal is received with the time-of-flight measuring-sensor; if no reflection signal associated with the emitted time-of-flight measuring-signal is received with the time-of-flight measuring-sensor, implementing one or multiple measure(s) intended to cause a reflection signal associated with a time-of-flight measuring-signal emitted with the time-of-flight measuring-sensor in the direction of the empty section to be receivable with the time-of-flight measuring- (Continued)

sensor. Also described are a method and a device for operating a parking facility, a parking facility and a computer program.

13 Claims, 3 Drawing Sheets

(51) Int. Cl.
    *G01S 13/89*     (2006.01)
    *G01S 15/89*     (2006.01)
    *G01S 17/89*     (2020.01)
    *G08G 1/14*     (2006.01)

(52) U.S. Cl.
    CPC ......... *G05D 1/0223* (2013.01); *G05D 1/0276* (2013.01); *G08G 1/146* (2013.01); *G05D 2201/0213* (2013.01)

(58) Field of Classification Search
    CPC .... G05D 1/0213; G05D 1/0276; G01S 13/89; G01S 15/89; G01S 17/89
    See application file for complete search history.

(56) References Cited

U.S. PATENT DOCUMENTS

| | | | |
|---|---|---|---|
| 2010/0007525 A1* | 1/2010 | Shanbhag | G08G 1/14 340/932.2 |
| 2010/0309024 A1* | 12/2010 | Mimeault | G08G 1/14 340/932.2 |
| 2012/0280847 A1 | 11/2012 | Frucht | |
| 2014/0210646 A1* | 7/2014 | Subramanya | G06K 9/00812 340/928 |
| 2015/0116134 A1* | 4/2015 | Wang | G08G 1/14 340/932.2 |
| 2015/0336013 A1 | 11/2015 | Stenzler et al. | |
| 2017/0039852 A1* | 2/2017 | Nordbruch | B64C 39/024 |
| 2017/0345302 A1* | 11/2017 | Esteban | G08G 1/142 |

FOREIGN PATENT DOCUMENTS

| | | |
|---|---|---|
| DE | 3734486 A1 | 4/1989 |
| DE | 102012222562 A1 | 6/2014 |
| DE | 102014211557 A1 | 12/2015 |
| DE | 102015214811 A1 | 2/2017 |
| EP | 1394564 A2 | 3/2004 |
| EP | 2712373 A1 | 4/2014 |
| EP | 2756484 A2 | 7/2014 |
| JP | H06118178 A | 4/1994 |
| JP | H08305998 A | 11/1996 |
| JP | H09311998 A | 12/1997 |
| JP | 2007024709 A | 2/2007 |
| JP | 2016157281 A | 9/2016 |
| WO | 2014152369 A2 | 9/2014 |
| WO | 2016066362 A1 | 5/2016 |

\* cited by examiner

METHOD FOR PREPARING AN EMPTY SECTION OF A PARKING FACILITY FOR AN OPERATION OF THE PARKING FACILITY AND METHOD FOR OPERATING THE PARKING FACILITY

FIELD OF THE INVENTION

The present invention relates to a method for preparing an empty section of a parking facility for an operation of the parking facility. The present invention furthermore relates to a method and to a device for operating a parking facility. The present invention furthermore relates to a parking facility and to a computer program.

BACKGROUND INFORMATION

Time of flight measuring sensors are usually situated within a parking facility and scan for objects within the parking facility. It is possible that a time of flight measuring sensor erroneously does not detect an object even though an object is actually present within the parking facility.

Motor vehicles which are driverlessly guided within the parking facility, however, in general require a reliable object detection on the part of the time of flight measuring sensor.

If the time of flight measuring sensor now erroneously does not detect an object here, a risk of a collision exists between the motor vehicles and the erroneously undetected object.

SUMMARY OF THE INVENTION

The object underlying the present invention is to provide a concept which makes it possible for a motor vehicle to drive efficiently at least semi-automatedly within the parking facility.

This object is achieved with the aid of the respective subject matter as described herein. Advantageous embodiments of the present invention are the subject matter of the respective further descriptions herein.

According to a first aspect, a method for preparing an empty section of a parking facility for an operation of the parking facility is provided, including the following steps:

a) carrying out a measurement of the empty section of the parking facility, using a time of flight measuring sensor situated in a stationary manner within the parking facility, by emitting a time of flight measuring signal with the aid of the time of flight measuring sensor in the direction of the section and checking whether a reflection signal associated with the emitted time of flight measuring signal is received with the aid of the time of flight measuring sensor;

b) if no reflection signal associated with the emitted time of flight measuring signal is received with the aid of the time of flight measuring sensor, carrying out one or multiple measure(s) intended to cause a reflection signal associated with a time of flight measuring signal emitted with the aid of the time of flight measuring sensor in the direction of the empty section to be receivable with the aid of the time of flight measuring sensor.

The present invention is based on the finding that the above object may be achieved by measuring an empty section of the parking facility to check whether a time of flight measuring signal emitted with the aid of the time of flight measuring sensor always causes a reflection signal which is receivable with the aid of the time of flight measuring sensor. If, for example, no reflection signal is measurable and/or receivable with the aid of the time of flight measuring sensor, it is established that the present situation is too vague to allow a motor vehicle to drive at least semi-automatedly within the section. The reason is that it is unclear, for example, whether an object is present within the section, which is just not detectable by the time of flight measuring sensor. For example, such a reflection of the time of flight measuring signal by such an object is too weak for a reception and/or does not take place back in the direction of the time of flight measuring sensor. It would then mistakenly be assumed here that no object is present within the section, even though one is present after all.

Furthermore, it is possible that the section is situated partially outside a range of the time of flight measuring sensor. Again, it is not possible here to provide information for the portion situated outside the range as to whether or not an object is situated within the portion.

Furthermore, it is possible that the section is at least partially open, i.e., is at least partially not delimited by an infrastructure element, for example a wall or a column. Thus, a body on which the time of flight measuring signal may be reflected is at least partially missing. However, since it is not possible to distinguish this case from the case in which the reflection of the time of flight measuring signal by a present object is too weak for a reception and/or does not take place back in the direction of the time of flight measuring sensor, it is thus not possible to provide reliable information, based on the measurement with the aid of the time of flight measuring sensor, as to whether or not the section is negotiable, i.e., whether or not the section is free, when, after an emission of the time of flight measuring signal, no reflection signal associated with the time of flight measuring signal is receivable and/or measurable with the aid of the time of flight measuring sensor.

However, since one or multiple measure(s) is/are carried out as needed, which are to cause a reflection signal associated with a time of flight measuring signal emitted with the aid of the time of flight measuring sensor in the direction of the empty section to be receivable with the aid of the time of flight measuring sensor, the section may be efficiently prepared for an operation of the parking facility. The reason is that the above-described lack of clarity may be eliminated so that reliable information may be provided as to whether or not the section is freely negotiable.

Thus, a motor vehicle may then advantageously drive efficiently and safely within the parking facility at least semi-automatedly.

An empty section of the parking facility indicates a section which is free of road users. Road users are motor vehicles and/or persons, for example. Ultimately, only the infrastructure elements of the parking facility thus remain within the empty section.

Since the section is empty within the scope of the preparation, a defined starting situation is created, in which an efficient measurement of the section is possible.

This means thus that an empty section only still includes the infrastructure elements which are always present. This means that these infrastructure elements are always present, regardless of whether or not road users are present within the section.

Infrastructure elements include, for example, the following infrastructure elements: wall, column, ceiling, archway, ramp, barrier, curb, guide post, door, bollard, roadway elevation. This means that an infrastructure element is, for example, an element selected from this group of infrastructure elements.

A time of flight measuring sensor denotes a sensor which is able to carry out a time of flight measurement by emitting a time of flight measuring signal with the aid of the sensor, the time of flight of a reflection signal which is associated with the emitted time of flight measuring signal and received with the aid of the sensor being ascertained. Based on the time of flight measurement, i.e., on the ascertained time of flight, it is thus possible to ascertain a distance or a spacing between a time of flight measuring sensor and an object, for example, an infrastructure element.

For example, a time of flight measuring sensor is one of the following sensors:

radar sensor, LIDAR sensor, ultrasonic sensor, or infrared sensor.

A radar sensor emits a radar signal. A LIDAR sensor emits a LIDAR signal. An ultrasonic sensor emits an ultrasonic signal. An infrared sensor emits an infrared signal. The reflection signals corresponding to these sensors are then a radar signal, a LIDAR signal, an ultrasonic signal and an infrared signal, respectively.

According to one specific embodiment, multiple time of flight measuring sensors are provided, which, for example, are configured to be the same or different, for example.

Comments made in conjunction with one time of flight measuring sensor apply analogously to multiple time of flight measuring sensors, and vice versa.

According to one specific embodiment, it is provided that multiple empty sections are prepared. This means that when the singular is used for the section, the plural shall always be implied, and vice versa.

Embodiments that are provided in connection with the preparation of one empty section apply analogously to the preparation of multiple empty sections, and vice versa.

According to one specific embodiment, the entire empty parking facility is prepared analogously to the one section.

In one specific embodiment, it is provided that it is checked whether the implementation of the one or of the multiple measure(s) was successful; if not, steps a) and b) being repeated until the implemented measures are successful.

This, for example, yields the technical advantage that the section may be efficiently prepared. In particular, this yields the technical advantage that all the above-described lack of clarity may be eliminated.

According to one specific embodiment, it is provided that the one or the multiple measure(s) include(s) situating a reflecting body in the section.

This yields the technical advantage, for example, that the time of flight measuring signal may be efficiently reflected in the direction of the time of flight measuring sensor.

According to one specific embodiment, it is provided that the one or the multiple measure(s) include(s) situating a reflector for reflecting the time of flight measuring signal on an infrastructure element of the parking facility.

This yields the technical advantage, for example, that the infrastructure element may be efficiently detected with the aid of the time of flight measuring sensor. The reason is that a reflector is now present, which is able to efficiently reflect the time of flight measuring signal used by the time of flight measuring sensor for the time of flight measurement back in the direction of the time of flight measuring sensor.

In one specific embodiment, it is provided that the one or the multiple measure(s) include(s) applying a reflecting paint onto an infrastructure element of the parking facility.

This yields the technical advantage, for example, that the infrastructure element may be efficiently detected with the aid of the time of flight measuring sensor. The reason is that a reflecting paint is now present, which is able to efficiently reflect the time of flight measuring signal used by the time of flight measuring sensor for the time of flight measurement back in the direction of the time of flight measuring sensor.

The reflector and/or the reflecting paint includes metal particles, for example. Metal particles efficiently reflect radar waves, for example.

For example, the reflector is a metal object. Metal objects efficiently reflect radar waves particularly well in the direction of a radar sensor.

According to one specific embodiment, multiple reflectors are provided, which, for example, are configured to be the same or different, for example. Comments made in conjunction with one reflector apply analogously to multiple reflectors, and vice versa.

According to one specific embodiment, it is provided that the one or the multiple measure(s) include(s) aligning the time of flight measuring sensor or situating the time of flight measuring sensor in a different position relative to its instantaneous position within the parking facility.

This yields the technical advantage, for example, that a portion of the section which previously was not yet detectable with the aid of the time of flight measuring sensor may be detected after the alignment with the aid of the time of flight measuring sensor.

In one specific embodiment, it is provided that the one or the multiple measure(s) include(s) situating an additional time of flight measuring sensor for detecting the section. This means, for example, that the additional time of flight measuring sensor is situated in a stationary manner within the parking facility in such a way that the additional time of flight measuring sensor detects the section.

The additional time of flight measuring sensor is one of the above-described sensors, for example.

When the singular is used for the additional time of flight measuring sensors, the plural shall always be implied, and vice versa.

In one specific embodiment, it is provided that it is checked whether the implementation of the one or of the multiple measure(s) was successful; if not, steps a) and b) being repeated until the implemented measures are successful, the empty section being detected with the aid of the time of flight measuring sensor if the implemented measures are successful, and the detected section being established as a reference free space for the operation of the parking facility.

This yields the technical advantage, for example, that a reference free space may be efficiently provided for the operation of the parking facility, which during operation of the parking facility is used as a basis for the information as to whether or not the section is negotiable for a motor vehicle driving at least semi-automatedly.

In one specific embodiment, it is provided that the method according to the first aspect is repeated in the event of a change in an infrastructure of the section. This means, for example, that steps a) and b) are repeated in the event of a change in the infrastructure of the section until the implemented measures are successful.

For example, a change in the infrastructure of the section may result from a modification of the section, because another infrastructure element was installed or removed.

According to a second aspect, a method for operating a parking facility is provided, including a section which was prepared according to one specific embodiment of the method according to the first aspect, in which it is checked whether the implementation of the one or of the multiple measure(s) was successful; if not, steps a) and b) being repeated until the implemented measures are successful, the empty section being detected with the aid of the time of flight measuring sensor if the implemented measures are successful, and the detected section being established as a reference free space for the operation of the parking facility.

The method according to the second aspect includes the following steps:

detecting the section with the aid of the time of flight measuring sensor;

ascertaining, based on the detected section and on the reference free space, whether or not the section is freely negotiable for a motor vehicle driving at least semi-automatedly within the parking facility; and if not, outputting a stop signal to the motor vehicle driving at least semi-automatedly.

In particular, it is provided that the detected section and the reference free space are compared to one another, it being established that the section is freely negotiable for a motor vehicle driving at least semi-automatedly within the parking facility when the detected section is identical to the reference free space and/or when the detected section is identical to the reference free space within a predefined tolerance range. Otherwise, it is established that the section is not freely negotiable for a motor vehicle driving at least semi-automatedly within the parking facility.

According to a third aspect, a device for operating a parking facility is provided, including a section which was prepared according to one specific embodiment of the method according to the first aspect, in which it is checked whether the implementation of the one or of the multiple measure(s) was successful; if not, steps a) and b) being repeated until the implemented measures are successful, the empty section being detected with the aid of the time of flight measuring sensor if the implemented measures are successful, and the detected section being established as a reference free space for the operation of the parking facility.

The device according to the third aspect includes:
a time of flight measuring sensor for detecting the section;
a processor for ascertaining, based on the detected section and on the reference free space, whether or not the section is freely negotiable for a motor vehicle driving at least semi-automatedly within the parking facility; and
an output unit for outputting a stop signal to the motor vehicle driving at least semi-automatedly when the section is not freely negotiable for the motor vehicle driving at least semi-automatedly.

In one specific embodiment, the output unit includes a wireless communication interface for sending a stop command as a stop signal via a wireless communication network to the motor vehicle driving at least semi-automatedly.

A wireless communication network includes, for example, a WLAN communication network and/or a mobile communication network.

In one specific embodiment, the output unit includes a visual and/or acoustic signal transmitter for outputting a visual and/or acoustic signal as a stop signal.

According to one specific embodiment, it is provided that the time of flight measuring sensor is situated in a stationary manner within the parking facility.

In one specific embodiment, it is provided that the time of flight measuring sensor is statically situated in a stationary manner within the parking facility. This means, for example, that the time of flight measuring sensor is not movable.

According to one specific embodiment, it is provided that the method for operating the parking facility is implemented or carried out with the aid of the device for operating the parking facility.

According to one specific embodiment, it is provided that the device for operating the parking facility is configured to implement or carry out the method for operating the parking facility.

Technical functionalities of the method for operating the parking facility are derived similarly from corresponding technical functionalities of the device for operating the parking facility, and vice versa.

This means, for example, that features with respect to the method for operating the parking facility are directly derived from similar corresponding features with respect to the device for operating the parking facility, and vice versa.

According to a fourth aspect, a parking facility is provided, including a device according to the third aspect, the time of flight measuring sensor being situated in a stationary manner within the parking facility.

According to a fifth aspect, a computer program is provided which includes program code for carrying out the method according to the second aspect when the computer program is executed on a computer, for example, on the processor of the device according to the third aspect.

According to one specific embodiment, a parking facility includes multiple parking spaces for motor vehicles.

According to one specific embodiment, a parking facility includes multiple infrastructure elements.

According to one specific embodiment, the time of flight measuring sensor is situated in a stationary manner on an infrastructure element.

The wording "respectively" includes in particular the wording "and/or."

The wording "at least semi-automatedly" includes, for example, the wording "in a highly automated manner" and/or "in a remote-controlled manner."

The present invention is described in greater detail hereafter based on the exemplary embodiments.

DETAILED DESCRIPTION

Figure 1:
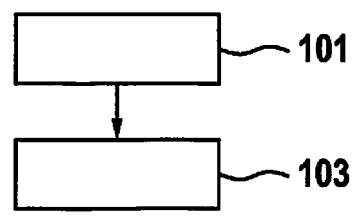
FIG. 1 shows a flow chart of a method for preparing an empty section of a parking facility.

FIG. 1 shows a flow chart of a method for preparing an empty section of a parking facility.

The method includes the following steps:
carrying out 101 a measurement of the empty section of the parking facility, using a time of flight measuring sensor situated in a stationary manner within the parking facility, by emitting a time of flight measuring signal with the aid of the time of flight measuring sensor in the direction of the section and checking whether a reflection signal associated with the emitted time of flight measuring signal is received with the aid of the time of flight measuring sensor;

if no reflection signal associated with the emitted time of flight measuring signal is received with the aid of the time of flight measuring sensor, implementing 103 one or multiple measure(s) intended to cause a reflection signal associated with a time of flight measuring signal emitted with the aid of the time of flight measuring sensor in the direction of the empty section to be receivable with the aid of the time of flight measuring sensor.

Figure 2:
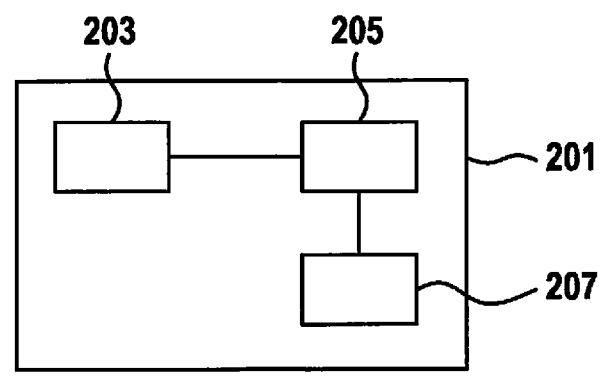
FIG. 2 shows a device for operating a parking facility.

FIG. 2 shows a device 201 for operating a parking facility, including a section which was prepared according to one specific embodiment of the method according to the first aspect, in which it is checked whether the implementation of the one or of the multiple measure(s) was successful; if not, steps a) and b) being repeated until the implemented measures are successful, the empty section being detected with the aid of the time of flight measuring sensor if the implemented measures are successful, and the detected section being established as a reference free space for the operation of the parking facility.

Device 201 includes:
a time of flight measuring sensor 203 for detecting the section;
a processor 205 for ascertaining, based on the detected section and on the reference free space, whether or not the section is freely negotiable for a motor vehicle driving at least semi-automatedly within the parking facility; and
an output unit 207 for outputting a stop signal to the motor vehicle driving at least semi-automatedly when the section is not freely negotiable for the motor vehicle driving at least semi-automatedly.

Figure 3:
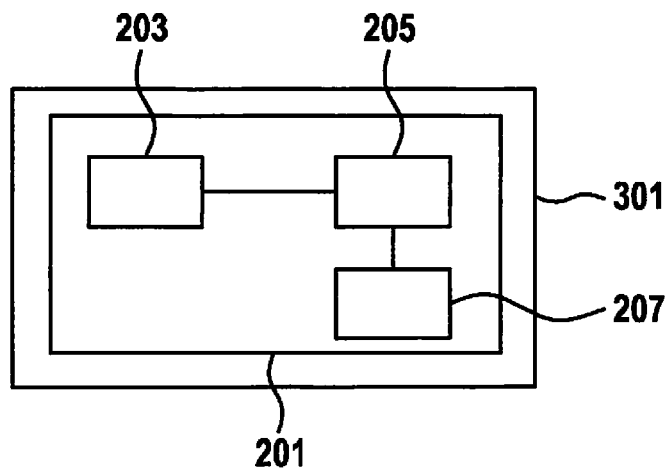
FIG. 3 shows a parking facility.

FIG. 3 shows a parking facility 301.

Parking facility 301 includes device 201 according to FIG. 2, time of flight measuring sensor 203 being situated in a stationary manner within parking facility 301.

Figure 4:
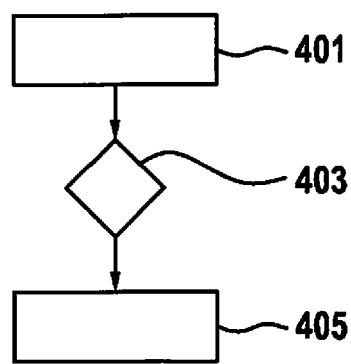
FIG. 4 shows a flow chart of a method for operating a parking facility.

FIG. 4 shows a flow chart of a method for operating a parking facility 301, including a section which was prepared according to one specific embodiment of the method according to the first aspect, in which it is checked whether the implementation of the one or of the multiple measure(s) was successful; if not, steps a) and b) being repeated until the implemented measures are successful, the empty section being detected with the aid of the time of flight measuring sensor if the implemented measures are successful, and the detected section being established as a reference free space for the operation of the parking facility.

The method for operating the parking facility includes the following steps:
detecting 401 the section with the aid of the time of flight measuring sensor;
ascertaining 403, based on the detected section and on the reference free space, whether or not the section is freely negotiable for a motor vehicle driving at least semi-automatedly within the parking facility; and
if not, outputting 405 a stop signal to the motor vehicle driving at least semi-automatedly.

Figure 5:
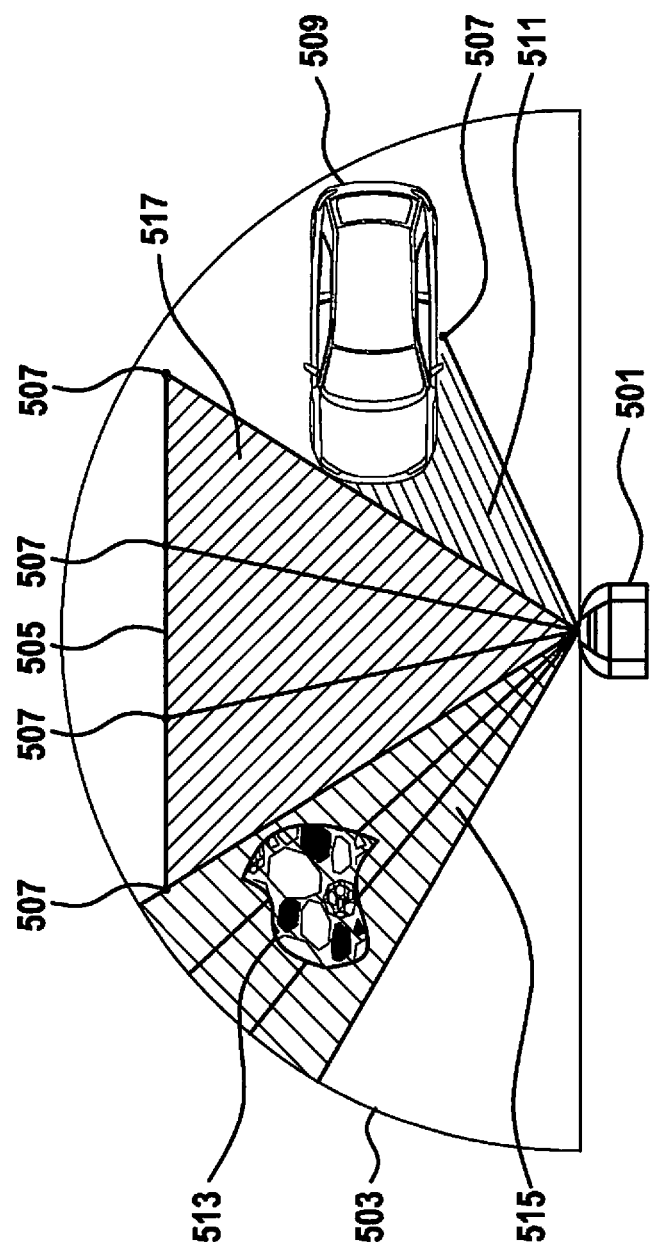
FIG. 5 shows a time of flight measuring sensor during the detection of a section of a parking facility.

FIG. 5 shows a time of flight measuring sensor 501, which is situated in a stationary manner within a parking facility.

Time of flight measuring sensor 501 detects or measures a section 503 of the parking facility.

A wall 505 is situated within section 503 as an infrastructure element. This wall 505 is detected with the aid of time of flight measuring sensor 501. This takes place in that time of flight measuring signals emitted with the aid of time of flight measuring sensor 501 are reflected back by wall 505 in the direction of time of flight measuring sensor 501. Time of flight measuring sensor 501 thus receives and/or measures a corresponding reflection signal.

In this regard, measuring points 507 may be assigned to wall 505, on which the time of flight measuring signals are reflected back in the direction of time of flight measuring sensor 501.

Within section 503, a motor vehicle 509 is driving at least semi-automatedly. For example, motor vehicle 509 is driving autonomously.

Motor vehicle 509 is also detected with the aid of time of flight measuring sensor 501. Similarly to wall 505, a measuring point 507 may also be assigned to motor vehicle 509, on which the time of flight measuring signals are reflected back in the direction of time of flight measuring sensor 501.

Within the scope of a method for preparing section 503, it is provided that no road users are present any longer within the parking facility. In this regard, the parking facility is empty. Motor vehicle 509 is then not present.

Furthermore, an object 513 is situated within section 503. Object 513 is another infrastructure element, for example.

Within the scope of the method for preparing section 503, it was established based on the corresponding measurement that object 513 was not detected with the aid of time of flight measuring sensor 501. Within the scope of the method for preparing section 503, motor vehicle 509 is thus not present within section 503.

The fact that object 513 was not detected may be due, for example, to object 513 being situated outside a measuring distance of time of flight measuring sensor 501.

This may be due to the fact, for example, that the reflection of the time of flight measuring signals emitted with the aid of time of flight measuring sensor 501 by object 513 back in the direction of time of flight measuring sensor 501 is too weak and/or non-existent.

Object 513 was provided with a camouflage pattern in this regard due to the non-detection, to illustrate this in the drawing.

Since object 513 is not detectable with the aid of time of flight measuring sensor 501, it is not possible to assign any measuring points to object 513, as was possible to carry out for wall 505 and motor vehicle 509. Thus, measuring points for object 513 are missing.

Without an implementation of measures corresponding to the method for preparing section 503, a portion of section 503 would exist which, based on a detection with the aid of time of flight measuring sensor 501, would erroneously be established as being freely negotiable for motor vehicle 509. This portion is indicated by reference numeral 515.

Since wall 505 sufficiently reflects the time of flight measuring signals back in the direction of time of flight measuring sensor 501, it is possible here within the scope of the method for preparing section 503 to reliably and safely establish another portion of section 503 which is negotiable for motor vehicle 509. This further portion is indicated by reference numeral 517 and has a different hatching compared to portion 515.

If motor vehicle 509 were to drive into area 515, it could collide with object 513.

However, the method for preparing section 503 provides for an implementation of one or for multiple measure(s), which are to cause a reflection signal associated with a time of flight measuring signal emitted with the aid of time of flight measuring sensor 501 in the direction of section 503 to be receivable with the aid of time of flight measuring sensor 501.

For example, it is provided that object 513 is painted with a reflecting paint.

After a successful implementation of the corresponding measures, section 503, if still empty, is again detected with the aid of time of flight measuring sensor 501. Detected empty section 503 is established as a reference free space for the operation of the parking facility.

It shall be noted at this point that, for the sake of clarity, it was omitted in FIG. 5 that the entire section 503 was successfully measured. This means that, according to the illustration according to FIG. 5, there are still unmeasured portions. Nonetheless, it is provided to measure section 503 and implement corresponding measures until the entire section 505 may be provided with a hatching similar to further portion 517, i.e., until the entire section 503 was prepared in such a way that time of flight measuring sensor 501 always receives a reflection signal when time of flight measuring sensor 501 emits a time of flight measuring signal in the direction of section 503.

During operation of the parking facility, section 503 is again detected with the aid of time of flight measuring sensor 501, it being ascertained, based on the detected section and on the reference free space, whether or not section 503 is freely negotiable for a motor vehicle driving at least semi-automatedly within the parking facility. If not, it is provided that a stop signal is output to the motor vehicle driving at least semi-automatedly.

For example, the ascertainment as to whether or not section 503 is freely negotiable for a motor vehicle driving at least semi-automatedly within the parking facility includes a comparison of section 503 detected during operation of the parking facility to the reference free space, to ascertain a difference, it being determined that the section is not free when the difference is greater than a predefined difference threshold value.

Furthermore, another portion of section 503 in FIG. 5 is identified by reference numeral 511 and provided with a hatching which is different from the hatchings of portions 515 and 517. The other portion 511 is established as not being free, insofar as motor vehicle 509 is instantaneously driving through section 503. If no motor vehicle 509 were to drive through section 503, the other portion 511 would, of course, also be established as being free.

What is claimed is:

1. A method for preparing an empty section of a parking facility for an operation of the parking facility, the method comprising:
    a) measuring the empty section of the parking facility, wherein the empty section includes the entire parking facility, prior to use or presence of any road users within the empty section, using a time of flight measuring sensor situated in a stationary manner within the parking facility, by emitting a time of flight measuring signal with the time of flight measuring sensor in the direction of the section and checking whether a reflection signal associated with the emitted time of flight measuring signal is received with the time of flight measuring sensor; and
    b) implementing prior to use or presence of any road users within the empty section, if no reflection signal associated with the emitted time of flight measuring signal is received with the time of flight measuring sensor, one or multiple measures intended to cause a reflection signal associated with a time of flight measuring signal emitted with the time of flight measuring sensor in the direction of the empty section to be receivable with the time of flight measuring sensor.

2. The method of claim 1, wherein it is checked whether the implementation of the one or of the multiple measures was successful, and if not, repeating tasks a) and b) until the implemented measures are successful.

3. The method of claim 1, wherein the one or the multiple measures includes situating a reflecting body in the section.

4. The method of claim 1, wherein the one or the multiple measures includes situating a reflector for reflecting the time of flight measuring signal on an infrastructure element of the parking facility.

5. The method of claim 1, wherein the one or the multiple measures includes applying a reflecting paint onto an infrastructure element of the parking facility.

6. The method of claim 1, wherein the one or the multiple measures includes aligning the time of flight measuring sensor or situating the time of flight measuring sensor in a different position relative to its instantaneous position within the parking facility.

7. The method of claim 1, wherein the one or the multiple measures includes situating an additional time of flight measuring sensor for detecting the section.

8. The method of claim 1, wherein tasks a) and b) are repeated if there is a change in an infrastructure of the section.

9. The method of claim 2, wherein, if the implemented measures are successful, the empty section is detected with the time of flight measuring sensor, and wherein the detected section is established as a reference free space for the operation of the parking facility.

10. A method for operating a parking facility, which includes a section, the method comprising:
    detecting the section with the time of flight measuring sensor, wherein the section of the parking facility was prepared for an operation of the parking facility, by performing the following:
        a) measuring the section of the parking facility, wherein the section includes the entire parking facility, prior to use or presence of any road users within the empty section, using a time of flight measuring sensor situated in a stationary manner within the parking facility, by emitting a time of flight measuring signal with the time of flight measuring sensor in the direction of the section and checking whether a reflection signal associated with the emitted time of flight measuring signal is received with the time of flight measuring sensor; and
        b) implementing prior to use or presence of any road users within the empty section, if no reflection signal associated with the emitted time of flight measuring signal is received with the time of flight measuring sensor, one or multiple measures intended to cause a reflection signal associated with a time of flight measuring signal emitted with the time of flight measuring sensor in the direction of the section to be receivable with the time of flight measuring sensor;
    wherein it is checked whether the implementation of the one or of the multiple measures was successful, and if not, repeating tasks a) and b) until the implemented measures are successful, and wherein, if the implemented measures are successful, the section is detected with the time of flight measuring sensor, and wherein the detected section is established as a reference free space for the operation of the parking facility;
    ascertaining, based on the detected section and on the reference free space, whether the section is freely negotiable for a motor vehicle driving at least semi-automatedly within the parking facility; and
    outputting, if the section is not freely negotiable, a stop signal to the motor vehicle driving at least semi-automatedly.

11. A device for operating a parking facility, including a section, comprising:
- a time of flight measuring sensor for detecting the section, wherein the section of the parking facility was prepared for an operation of the parking facility, by performing the following:
  - a) measuring the section of the parking facility, wherein the section includes the entire parking facility, prior to use or presence of any road users within the empty section, using a time of flight measuring sensor situated in a stationary manner within the parking facility, by emitting a time of flight measuring signal with the time of flight measuring sensor in the direction of the section and checking whether a reflection signal associated with the emitted time of flight measuring signal is received with the time of flight measuring sensor; and
  - b) implementing prior to use or presence of any road users within the empty section, if no reflection signal associated with the emitted time of flight measuring signal is received with the time of flight measuring sensor, one or multiple measures intended to cause a reflection signal associated with a time of flight measuring signal emitted with the time of flight measuring sensor in the direction of the section to be receivable with the time of flight measuring sensor;
  - wherein it is checked whether the implementation of the one or of the multiple measures was successful, and if not, repeating tasks a) and b) until the implemented measures are successful, and wherein, if the implemented measures are successful, the section is detected with the time of flight measuring sensor, and wherein the detected section is established as a reference free space for the operation of the parking facility;
- a processor to ascertain, based on the detected section and on the reference free space, whether the section is freely negotiable for a motor vehicle driving at least semi-automatedly within the parking facility; and
- an output unit to output a stop signal to the motor vehicle driving at least semi-automatedly when the section is not freely negotiable for the motor vehicle driving at least semi-automatedly.

12. A parking facility, comprising:
- a device for operating a parking facility, including a section, including a time of flight measuring sensor for detecting the section, wherein the section of the parking facility was prepared for an operation of the parking facility, by performing the following:
  - a) measuring the section of the parking facility, wherein the section includes the entire parking facility, prior to use or presence of any road users within the empty section, using a time of flight measuring sensor situated in a stationary manner within the parking facility, by emitting a time of flight measuring signal with the time of flight measuring sensor in the direction of the section and checking whether a reflection signal associated with the emitted time of flight measuring signal is received with the time of flight measuring sensor; and
  - b) implementing prior to use or presence of any road users within the empty section, if no reflection signal associated with the emitted time of flight measuring signal is received with the time of flight measuring sensor, one or multiple measures intended to cause a reflection signal associated with a time of flight measuring signal emitted with the time of flight measuring sensor in the direction of the section to be receivable with the time of flight measuring sensor;
  - wherein it is checked whether the implementation of the one or of the multiple measures was successful, and if not, repeating tasks a) and b) until the implemented measures are successful, and wherein, if the implemented measures are successful, the section is detected with the time of flight measuring sensor, and wherein the detected section is established as a reference free space for the operation of the parking facility;
- a processor to ascertain, based on the detected section and on the reference free space, whether the section is freely negotiable for a motor vehicle driving at least semi-automatedly within the parking facility; and
- an output unit to output a stop signal to the motor vehicle driving at least semi-automatedly when the section is not freely negotiable for the motor vehicle driving at least semi-automatedly;
- wherein the time of flight measuring sensor is situated in a stationary manner within the parking facility.

13. A non-transitory computer readable medium having a computer program, which is executable by a processor, comprising:
- a program code arrangement having program code for preparing an empty section of a parking facility for an operation of the parking facility, by performing the following:
  - a) measuring the empty section of the parking facility, wherein the empty section includes the entire parking facility, prior to use or presence of any road users within the empty section, using a time of flight measuring sensor situated in a stationary manner within the parking facility, by emitting a time of flight measuring signal with the time of flight measuring sensor in the direction of the section and checking whether a reflection signal associated with the emitted time of flight measuring signal is received with the time of flight measuring sensor; and
  - b) implementing prior to use or presence of any road users within the empty section, if no reflection signal associated with the emitted time of flight measuring signal is received with the time of flight measuring sensor, one or multiple measures intended to cause a reflection signal associated with a time of flight measuring signal emitted with the time of flight measuring sensor in the direction of the empty section to be receivable with the time of flight measuring sensor.

* * * * *